(12) United States Patent
Yakobov et al.

(10) Patent No.: US 11,505,307 B2
(45) Date of Patent: Nov. 22, 2022

(54) PHONIC WHEEL AND RELATED SYSTEM AND METHOD

(71) Applicant: PRATT & WHITNEY CANADA CORP., Longueuil (CA)

(72) Inventors: Ella Yakobov, Montreal (CA); James Jarvo, St. Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 363 days.

(21) Appl. No.: 16/658,691

(22) Filed: Oct. 21, 2019

(65) Prior Publication Data

US 2021/0114716 A1 Apr. 22, 2021

(51) Int. Cl.
*B64C 11/44* (2006.01)
*B64D 27/24* (2006.01)
(Continued)

(52) U.S. Cl.
CPC ............ *B64C 11/44* (2013.01); *B64C 11/301* (2013.01); *B64D 27/24* (2013.01); *B64D 45/00* (2013.01); *F01D 7/00* (2013.01); *F01D 17/02* (2013.01); *F01D 17/24* (2013.01); *F01D 21/003* (2013.01); *G01B 7/023* (2013.01); *F05D 2270/80* (2013.01)

(58) Field of Classification Search
CPC . F03D 7/00; F03D 17/02; F03D 17/20; F03D 17/24; F01D 21/003; F01D 21/14; F01D 7/00; F01D 17/02; F01D 17/20; F01D 17/24; F05D 2270/80; B64C 11/34; B64C 11/301; B64C 11/44; B64C 11/305; B64C 11/40; B64D 45/00; B64D 45/0005; G01B 7/023
See application file for complete search history.

(56) References Cited

U.S. PATENT DOCUMENTS 4,626,781 A * 12/1986 Forkel ..................... B60T 8/171
310/155
4,833,405 A * 5/1989 Richards ................ G01D 5/243
324/207.16
(Continued)

FOREIGN PATENT DOCUMENTS

DE 3411773 A1 5/1985
EP 0353076 1/1990
(Continued)

OTHER PUBLICATIONS

European Patent Office, Communication dated Mar. 18, 2021 re: European search report for EP Patent Application No. 20203120.9.
(Continued)

*Primary Examiner* — Christopher Verdier
(74) *Attorney, Agent, or Firm* — Norton Rose Fulbright Canada LLP

(57) ABSTRACT

A phonic wheel having a body and a tooth is disclosed. An embodiment of the phonic wheel includes a body that is configured to rotate about a rotation axis. The tooth is attached to the body. The tooth has a first axial end relative to the rotation axis, a second axial end opposite the first axial end, and a mid portion extending between the first and second axial ends. The mid portion has a substantially axially uniform height from the body. The first axial end has a greater height from the body than the height of the mid portion.

19 Claims, 9 Drawing Sheets

(51) Int. Cl.
*F01D 17/02* (2006.01)
*B64C 11/30* (2006.01)
*G01B 7/02* (2006.01)
*F01D 17/24* (2006.01)
*F01D 21/00* (2006.01)
*B64D 45/00* (2006.01)
*F01D 7/00* (2006.01)

(56) References Cited

U.S. PATENT DOCUMENTS

| | | | |
|---|---|---|---|
| 4,934,901 | A | 6/1990 | Duchesneau |
| 5,897,293 | A | 4/1999 | Arel et al. |
| 5,913,659 | A | 6/1999 | Doolin et al. |
| 6,077,040 | A | 6/2000 | Pruden et al. |
| 6,232,770 | B1 * | 5/2001 | Schroeder ............. G01D 5/147 324/207.21 |
| 6,291,989 | B1 * | 9/2001 | Schroeder ............. G01P 3/4802 324/207.21 |
| 6,650,110 | B2 | 11/2003 | Schroeder et al. |
| 8,687,206 | B2 | 4/2014 | Hockaday |
| 8,692,543 | B2 | 4/2014 | Sanchez Exposito et al. |
| 2002/0180426 | A1 * | 12/2002 | Schroeder ............. G01B 7/315 324/207.25 |
| 2014/0007591 | A1 | 1/2014 | Khibnik et al. |
| 2015/0139798 | A1 | 5/2015 | Duke et al. |
| 2018/0304991 | A1 | 10/2018 | Kudrna et al. |

FOREIGN PATENT DOCUMENTS

| | | |
|---|---|---|
| EP | 1876422 A1 | 1/2008 |
| EP | 2431715 A1 | 3/2012 |
| EP | 2876046 A1 | 5/2015 |
| EP | 3396304 A1 | 10/2018 |
| WO | 8907058 A1 | 8/1989 |

OTHER PUBLICATIONS

English translation of EP patent document No. 1876422 dated Jan. 9, 2008, https://patents.google.com/patent/EP1876422A1/en?oq=EP1876422A1, accessed on Mar. 29, 2021.
English translation of German patent document No. 3411773 dated May 23, 1985, https://www.orbit.com/?locale=en&ticket=f2679ab1-25ad-4ba8-962c-938e88c86e0d&embedded=false#PatentDocumentPage, accessed on Mar. 29, 2021.
English translation of WO patent document No. 89/07058 dated Aug. 10, 1989, https://www.orbit.com/?locale=en&ticket=f2679ab1-25ad-4ba8-962c-938e88c86e0d&embedded=false#PatentDocumentPage, accessed on Mar. 29, 2021.

* cited by examiner

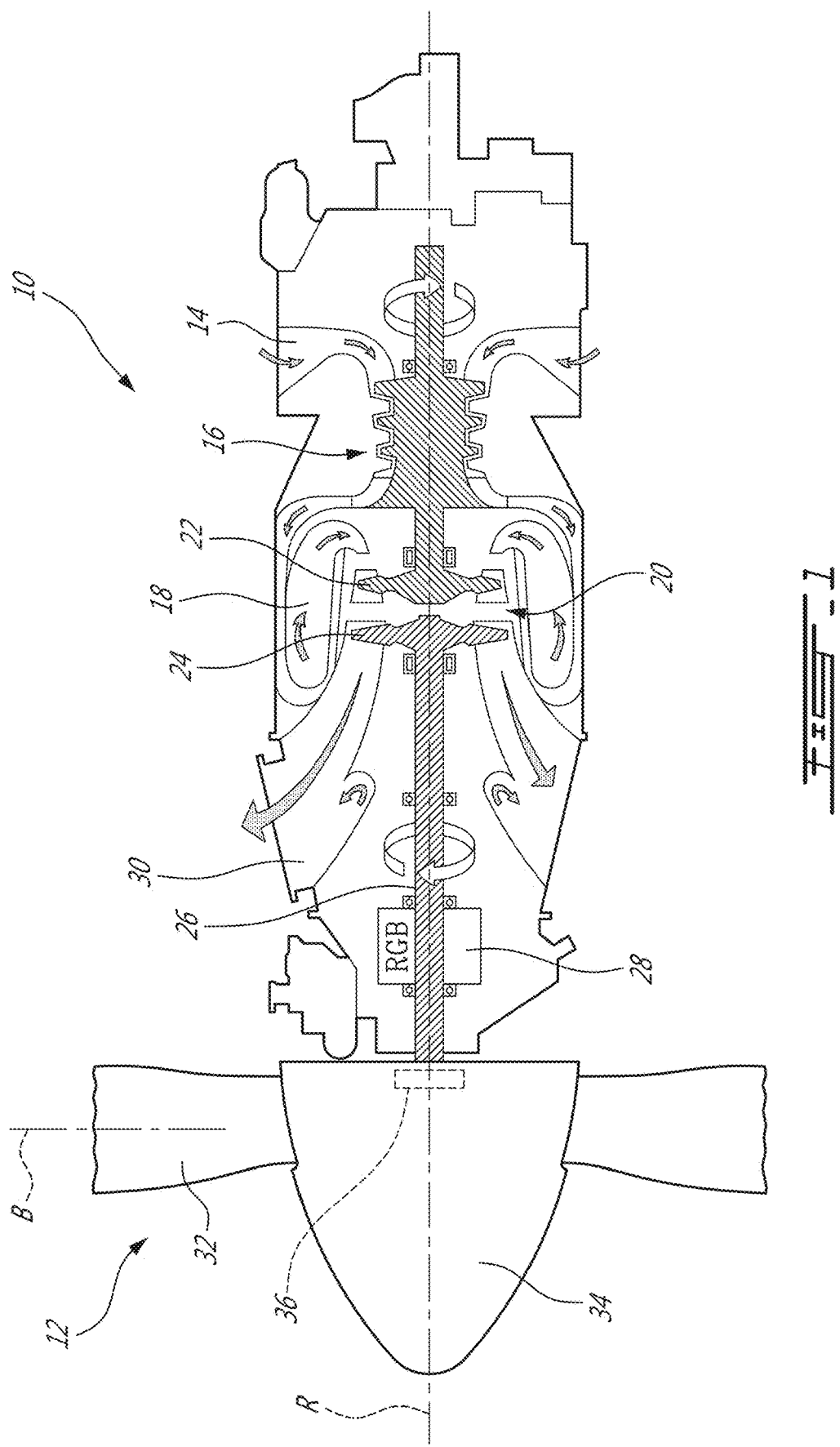

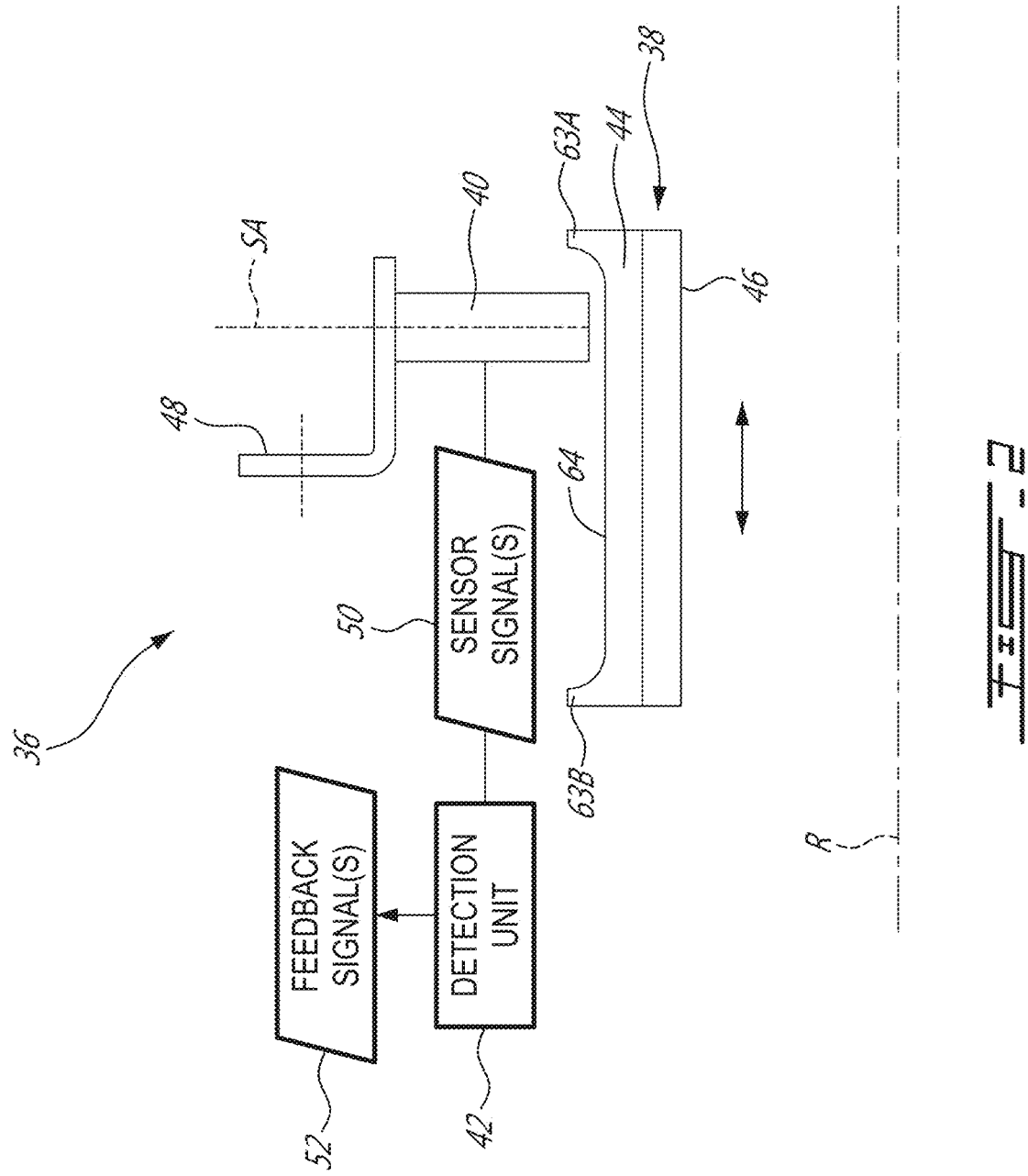

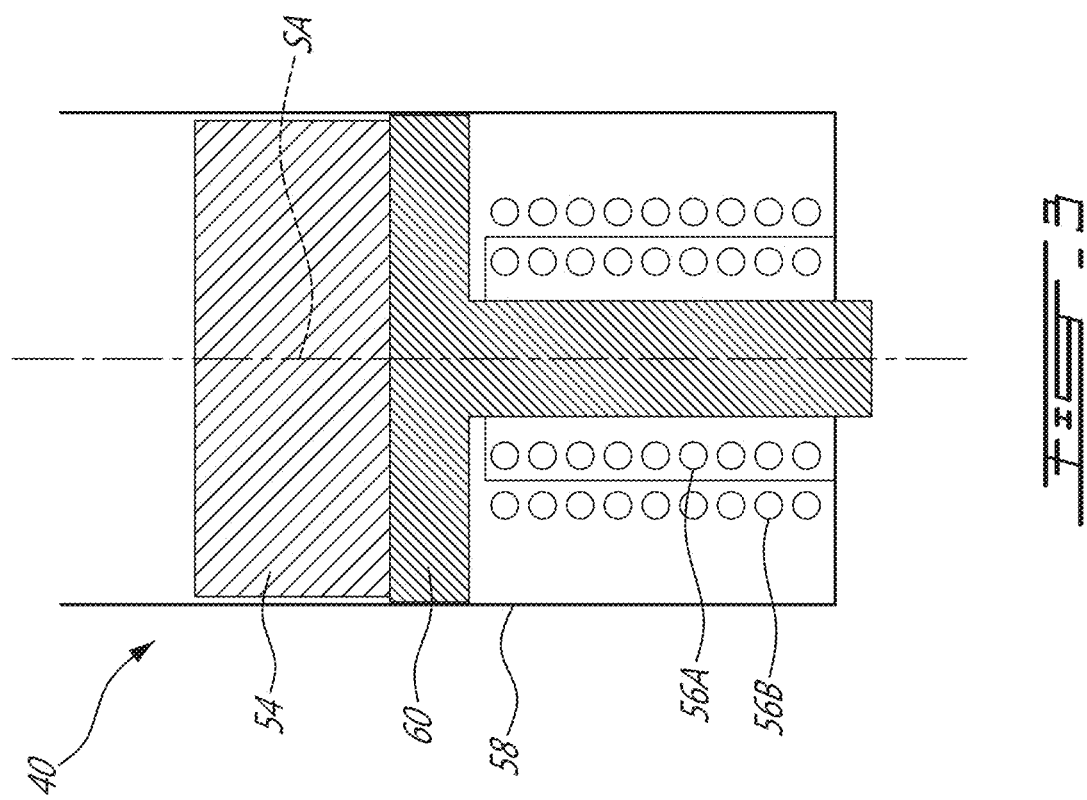

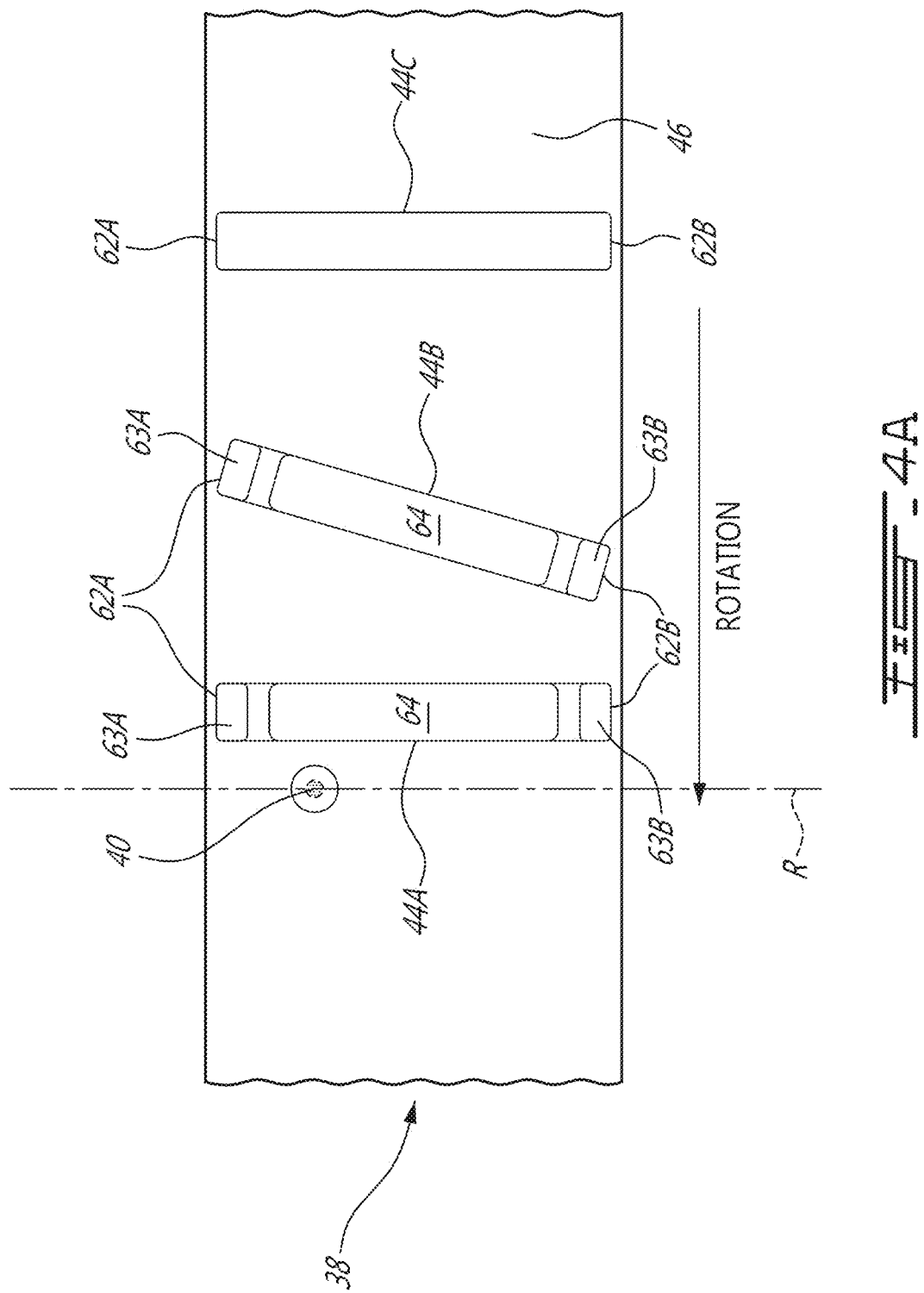

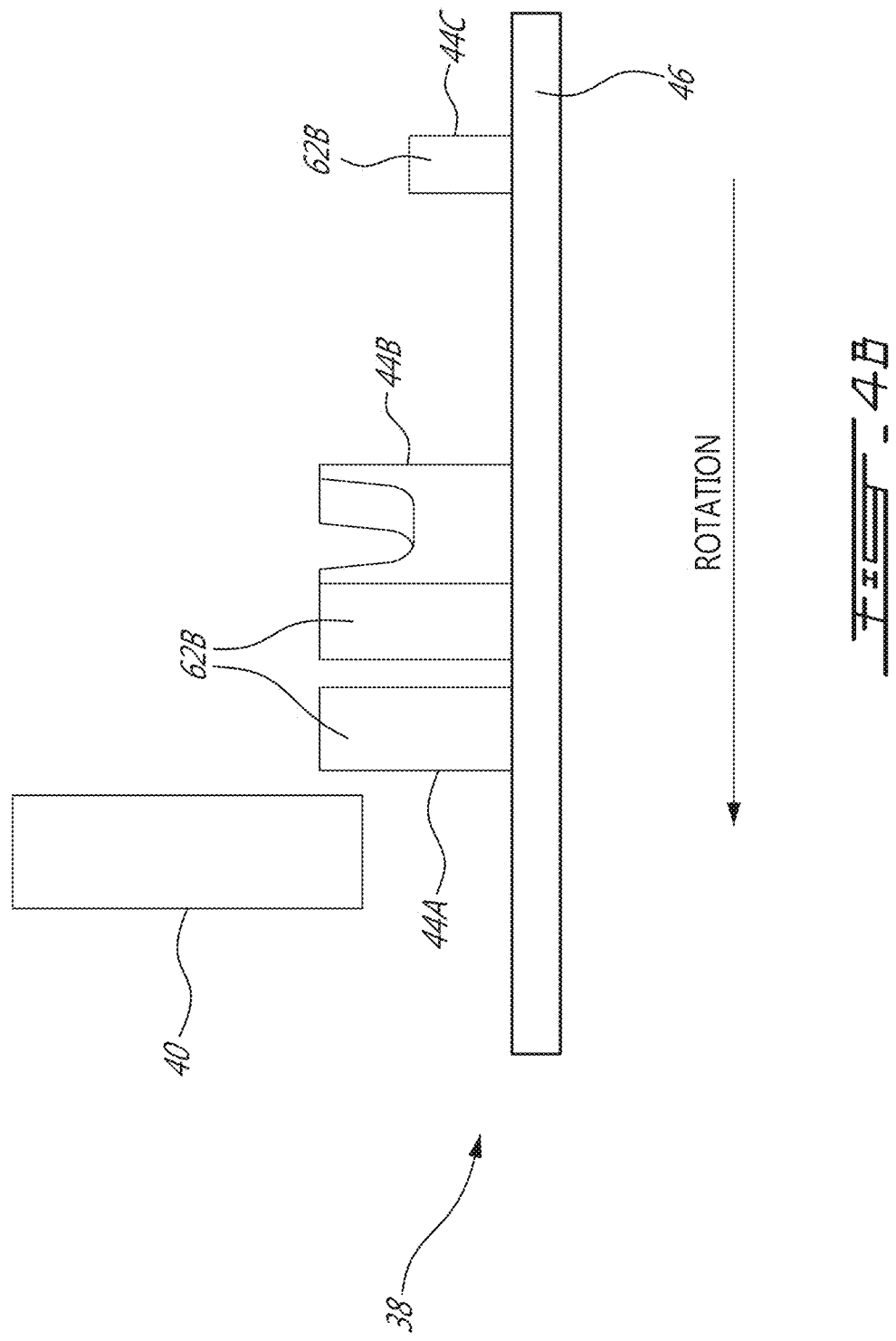

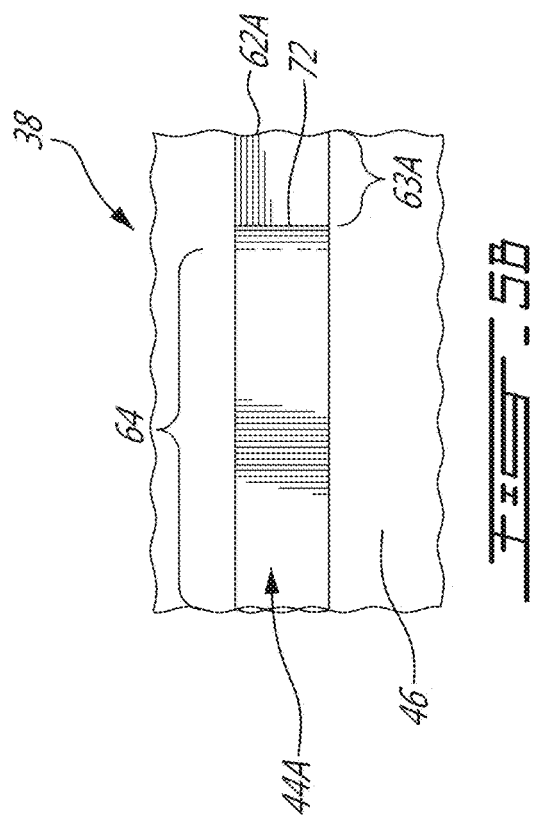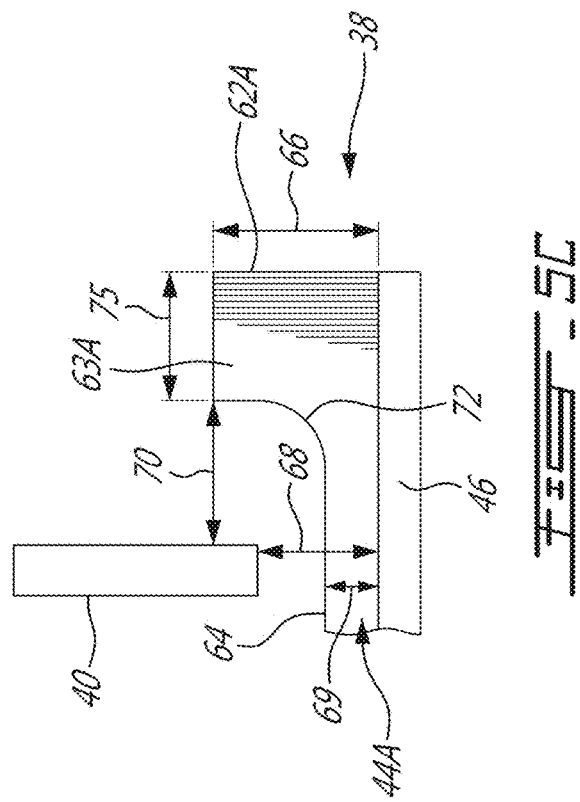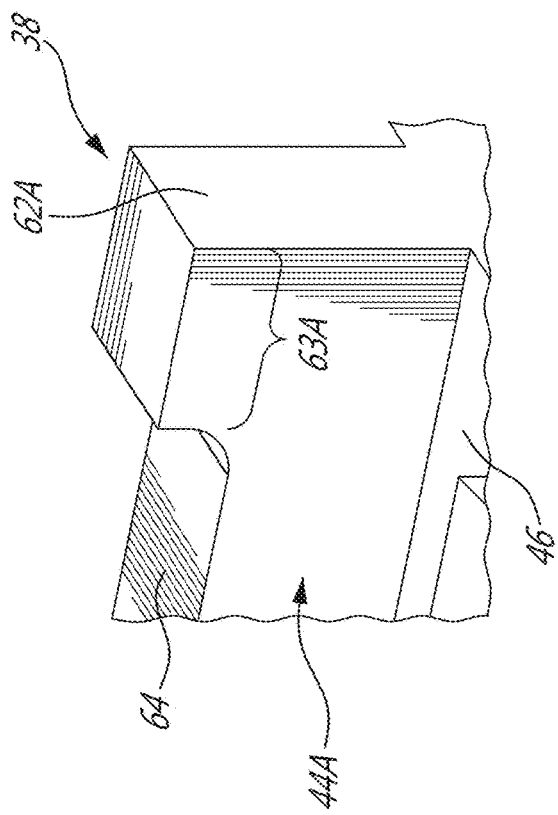

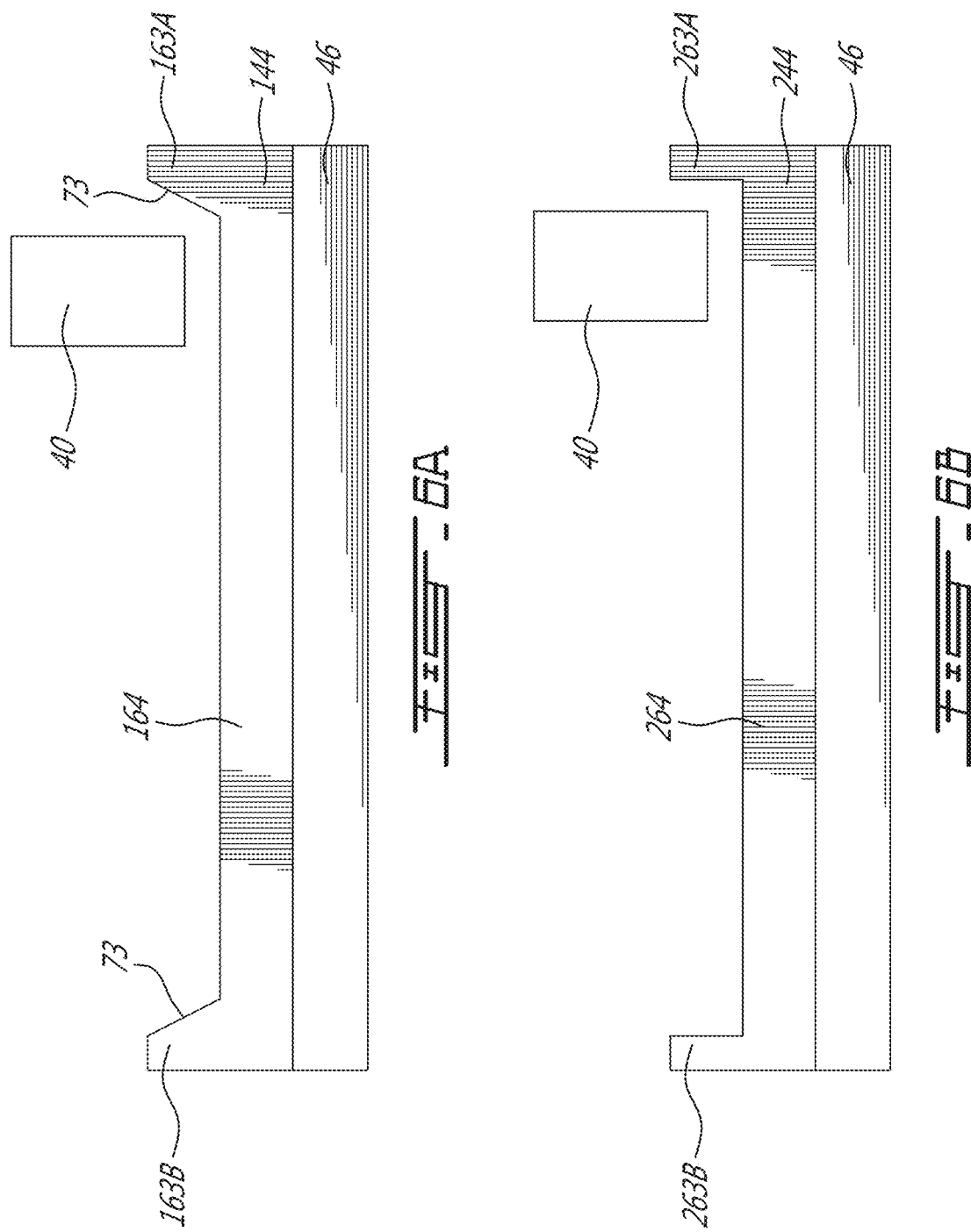

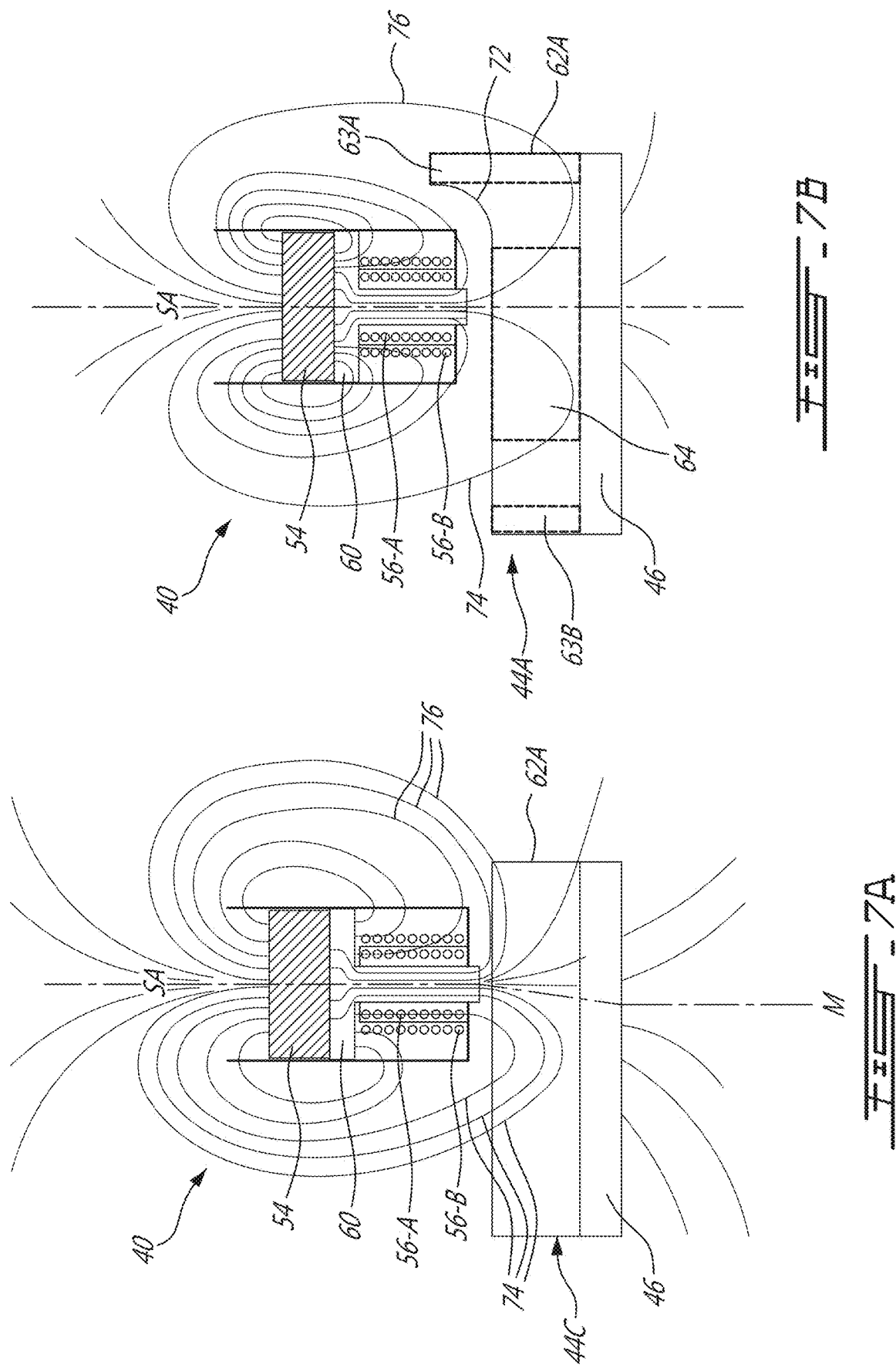

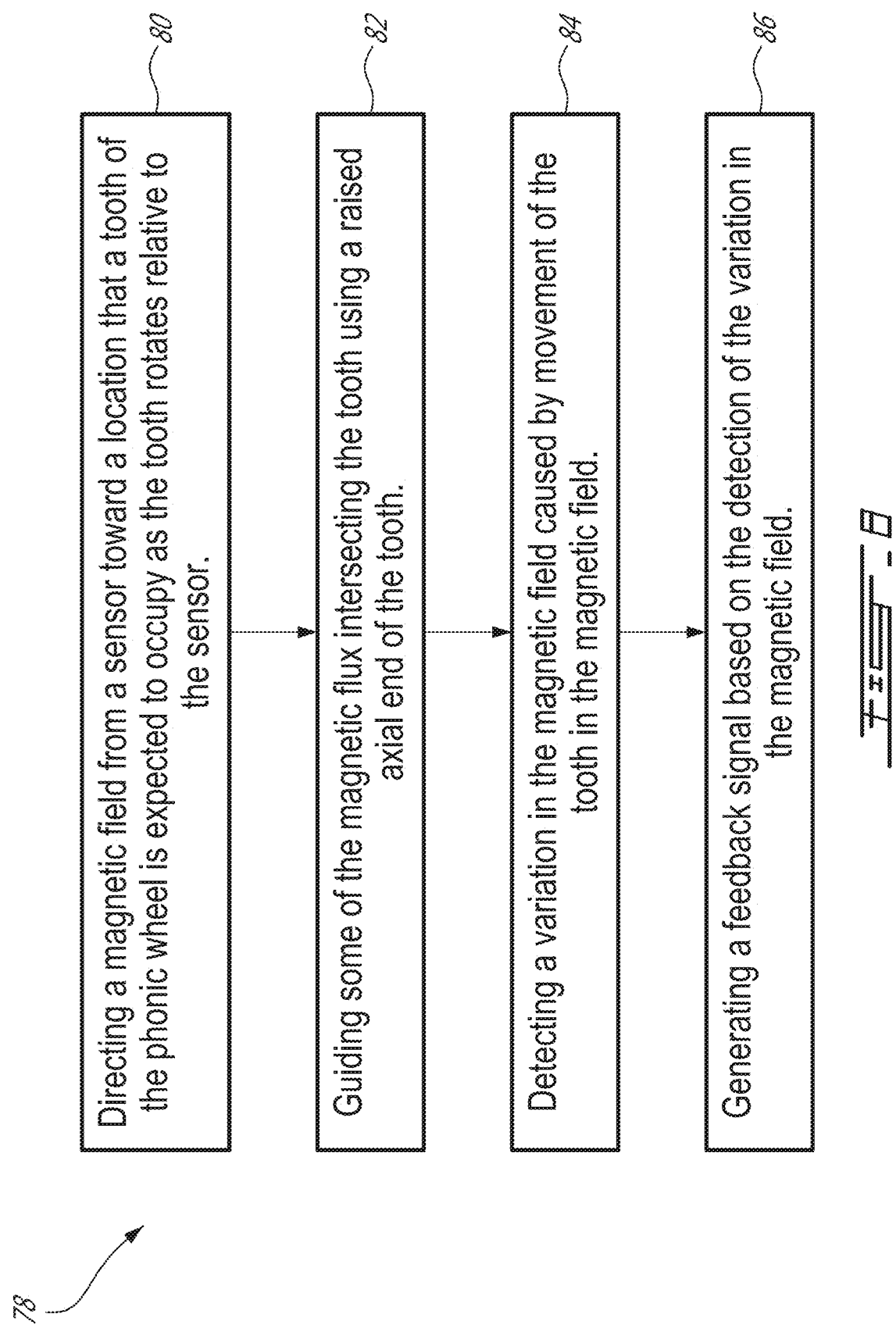

PHONIC WHEEL AND RELATED SYSTEM AND METHOD

TECHNICAL FIELD

The disclosure relates generally to phonic wheels and to feedback systems for pitch-adjustable blades of bladed rotors of aircraft.

BACKGROUND

On aircraft propeller systems that have variable pitch propeller blades, it is desirable to provide accurate feedback on the angular position, sometimes referred to as "beta angle", of the propeller blades. Such feedback can be used to control such angular position in a feedback control loop based on a requested set point. Such angular position feedback can also be used to ensure that the propeller is not inadvertently commanded to transition into excessively low or reverse beta angles, which could potentially be hazardous in some phases of flight of the aircraft. Due to the limited space available on aircraft engines, providing systems that can accurately and reliably provide positional feedback of the propeller blades is challenging.

SUMMARY

In one aspect, the disclosure describes a phonic wheel comprising:
  a body configured to rotate about a rotation axis; and
  a tooth attached to the body, the tooth having a first axial end relative to the rotation axis, a second axial end opposite the first axial end, and a mid portion extending between the first and second axial ends, the mid portion having a substantially axially uniform height from the body, the first axial end having a greater height from the body than the height of the mid portion.

In another aspect, the disclosure describes a feedback system for pitch-adjustable blades of a bladed rotor coupled to an aircraft engine. The system comprises:
  a feedback rotor configured to rotate with the aircraft bladed rotor about a rotation axis, the feedback rotor being axially displaceable along the rotation axis to a plurality of axial positions, the axial position of the feedback rotor corresponding to a respective pitch position of the pitch-adjustable blades, the feedback rotor having:
  a body; and
  a tooth attached to the body, the tooth having a first axial end relative to the rotation axis, a second axial end opposite the first axial end, and a mid portion extending between the first and second axial ends, the mid portion having a substantially axially uniform height from the body, the first axial end having a greater height from the body than the height of the mid portion; and
  a sensor mounted adjacent the feedback rotor and configured to generate a sensor signal indicative of a proximity of the tooth to the sensor as the feedback rotor rotates relative to the sensor; and
  a detector operatively connected to the sensor and configured to generate a feedback signal indicative of the respective pitch position of the pitch-adjustable blades in response to the sensor signal received from the sensor.

In a further aspect, the disclosure describes a method for providing a feedback signal using a phonic wheel. The method comprises:

directing a magnetic field from a sensor toward a location that a tooth of the phonic wheel is expected to occupy as the tooth rotates relative to the sensor, the magnetic field including magnetic flux intersecting the location that the rotating tooth is expected to occupy, the tooth having a first axial end relative to a rotation axis of the tooth, a second axial end opposite the first axial end, and a mid portion extending between the first and second axial ends, the mid portion having a substantially axially uniform height, the first axial end having a greater height than the height of the mid portion;
  using the first axial end of the tooth to guide some of the magnetic flux intersecting the tooth;
  detecting a variation in the magnetic field caused by movement of the tooth in the magnetic field; and
  generating a feedback signal based on the detection of the variation in the magnetic field.

Further details of these and other aspects of the subject matter of this application will be apparent from the detailed description included below and the drawings.

DESCRIPTION OF THE DRAWINGS

Reference is now made to the accompanying drawings, in which:

FIG. 1 is an axial cross-section view of an aircraft engine coupled to a bladed rotor with pitch-adjustable blades;

FIG. 2 is a schematic representation of a partial axial cross-section of an exemplary pitch feedback system for the pitch adjustable blades of the bladed rotor;

FIG. 3 is a respective schematic front view of an exemplary sensor of the feedback system of FIG. 2;

FIGS. 4A and 4B show a schematic top view and side view, respectively of the sensor in relation to teeth about to be detected by the sensor as a phonic wheel rotates about a rotation axis;

FIGS. 5A-5C show a perspective view, top view, and front view, respectively of a portion of a tooth of FIG. 4A;

FIGS. 6A and 6B are front elevation views other exemplary teeth of the phonic wheel;

FIGS. 7A and 7B each show a cross sectional view of a sensor proximal an axial edge of a tooth of FIG. 4A that generates a magnetic field that intersects the tooth; and FIG. 8 is a flowchart illustrating an exemplary method for providing a feedback signal using a phonic wheel.

DETAILED DESCRIPTION

The following description discloses phonic wheels and related systems and methods useful for accurately detecting one or more teeth of a rotating phonic wheel at a location near the axial end(s) of the one or more teeth, by mitigating edge effects influencing a magnetic field generated by a sensor. For example, a tooth of a phonic wheel may have a raised axial end relative to a mid portion of the tooth. The raised axial end of the tooth may guide some magnetic flux intersecting the tooth along one or more return paths to promote accurate detection of the passing of the tooth by the sensor as the phonic wheel rotates relative to the sensor. In some embodiments, the use of a raised axial end on a tooth may reduced the need for additional axial length of the tooth.

The phonic wheels, feedback systems and methods described herein may be useful in providing feedback on the angular (i.e., pitch) position of pitch-adjustable blades on aircraft bladed rotors such as aircraft propellers for example. However, the phonic wheels disclosed herein could also be used in other applications.

The term "substantially" as used herein may be applied to modify any quantitative representation which could permissibly vary without resulting in a change in the basic function to which it is related.

Aspects of various embodiments are described through reference to the drawings.

FIG. 1 is an axial cross-section view of an exemplary aircraft engine 10 coupled to bladed rotor 12 (e.g., propeller) for an aircraft. Engine 10 may be a gas turbine engine, of a type typically provided for use in subsonic flight, comprising inlet 14, into which ambient air is received, (e.g., multi-stage) compressor 16 for pressurizing the air, combustor 18 in which the compressed air is mixed with fuel and ignited for generating an annular stream of hot combustion gases, and turbine section 20 for extracting energy from the combustion gases. Turbine section 20 may comprise high-pressure turbine 22, which may drive compressor 16 and other accessories, and power turbine 24 which may rotate independently from high-pressure turbine 22 and which may drive power shaft 26, which may be drivingly coupled to bladed rotor 12 via reduction gearbox 28. Combustion gases may be evacuated through exhaust duct 30 after passing through turbine section 20.

Bladed rotor 12 may comprise a plurality of pitch-adjustable blades 32 extending radially from hub 34 and being circumferentially distributed relative to hub 34 of bladed rotor 12. Bladed rotor 12 may be a variable pitch bladed rotor where each blade 32 may be angularly adjustable about a respective axis B. Accordingly, each blade 32 may be rotatable about axis B using any suitable mechanism so that the pitch of blades 32 may be adjusted collectively in unison for different phases of operation (e.g., feather, forward thrust and reverse thrust) of engine 10 and/or of an aircraft to which engine 10 and bladed rotor 12 may be mounted. Even though FIG. 1 illustrates bladed rotor 12 as a propeller suitable for fixed-wing aircraft, it is understood that aspects of this disclosure are also applicable to other types of bladed rotors such as main rotors and tail rotors of rotary-wing aircraft such as helicopters for example.

Bladed rotor 12 may be mounted for rotation about rotation axis R. In some embodiments, rotation axis R may, but not necessarily, be coaxial with an axis of rotation of power shaft 26. FIG. 1 also schematically shows a feedback system 36 (referred hereinafter as "feedback system 36") associated with bladed rotor 12 and which is described below.

FIG. 2 is a schematic representation of a partial axial cross-section of an exemplary feedback system 36. In some embodiments, feedback system 36 may be a feedback system of engine 10 for providing feedback on the angular position of adjustable blades 32 of bladed rotor 12. Feedback system 36 may be configured to interface with known or other adjustable blade systems to permit the detection of the angular position (e.g., beta angle) of adjustable blades 32. In some embodiments, feedback system 36 may comprise a phonic wheel 38, sensor 40 and detection unit 42. FIG. 2 shows the phonic wheel 38 as a feedback rotor integrated within an engine 10 for providing feedback on the angular position of adjustable blades 32 of bladed rotor 12. However, it is understood that the feedback system 36 may be integrated within other systems to provide different forms of feedback.

In some embodiments, phonic wheel 38 may be configured to rotate with (e.g., be mechanically coupled to) bladed rotor 12 about rotation axis R. For example, in some embodiments, phonic wheel 38 may be configured to rotate at the same rotational speed and coaxially with bladed rotor 12. However, it is understood that the rotation axis of phonic wheel 38 may not necessarily by coaxial with rotation axis R of bladed rotor 12. Phonic wheel 38 may be axially displaceable along rotation axis R to a plurality of axial positions where an axial position of phonic wheel 38 may correspond to a respective angular (pitch) position of adjustable blades 32. Phonic wheel 38 may comprise circumferentially-spaced apart teeth 44 useful for detecting the axial position of phonic wheel 38 as phonic wheel 38 and bladed rotor 12 rotate. Phonic wheel 38 may consequently be useful for detecting the angular position of adjustable blades 32 by way of a correlation. Phonic wheel 38 may comprise (e.g., annular) body 46 or wheel with teeth 44 attached thereto and protruding radially therefrom. In some embodiments, teeth 44 and sensor 40 may be disposed on a radially-outer side of annular body 46. Alternatively, teeth 44 and sensor 40 could be disposed on a radially-inner side of annular body 46 instead.

In various embodiments, teeth 44 may be configured such that a passage of teeth 44 can be detected by sensor 40 as phonic wheel 38 rotates about rotation axis R. In various embodiments, teeth 44 may all be of the same geometric configuration or may comprise teeth of different geometric configurations. In some embodiments, one or more teeth 44 may be separate components individually secured to annular body 46 of phonic wheel 38. In some embodiments, one or more teeth 44 may be integrally formed with annular body 46 so that phonic wheel 38 may have a unitary construction.

Phonic wheel 38 may be operatively coupled with bladed rotor 12 to permit the axial position of phonic wheel 38 to correspond with the angular position of adjustable blades 32. The operative coupling of phonic wheel 38 and bladed rotor 12 may be as described in U.S. Patent Publication No. 2015/0139798 A1 (title: SYSTEM AND METHOD FOR ELECTRONIC PROPELLER BLADE ANGLE POSITION FEEDBACK), which is incorporated herein by reference.

Sensor 40 may be an inductive (e.g., proximity) sensor suitable for non-contact detection of the passage of teeth 44 as phonic wheel 38 rotates about rotation axis R. Sensor 40 may be mounted adjacent phonic wheel 38 and secured to some stationary structure of engine 10 via bracket 48 for example or other suitable means. In some embodiments, sensor 40 may be configured as a variable reluctance sensor (commonly called a VR sensor) suitable for detecting the proximity of (e.g., ferrous) teeth 44. Accordingly, teeth 44 may be configured to intersect a magnetic field generated by sensor 40 and cause a detectable variation in (e.g., disrupt) the magnetic field. For example, the passage of each tooth 44 may cause a change in magnetic permeability within the magnetic field generated by sensor 40 and may consequently cause a detectable variation in the magnetic field. In various embodiments, teeth 44 may comprise ferrous or other metallic material(s).

Detection unit 42 may be operatively connected to sensor 40 for receiving one or more sensor signals 50 and configured to generate one or more feedback signals 52 indicative of the angular position of adjustable blades 32. In various embodiments, detection unit 42 may form part of a Full Authority Digital Engine Control (FADEC) which may, for example, comprise one or more digital computer(s) or other data processors, sometimes referred to as electronic engine controller(s) (EEC) and related accessories that control at least some aspects of performance of engine 10. Accordingly, detection unit 42 may comprise one or more computing devices including, but not limited to, a digital computer, a processor (e.g. a microprocessor), and a memory. In some embodiments, sensor signal(s) 50 may also be used to provide feedback on the rotational speed of bladed rotor 12. Accordingly, detection unit 42 may, in some embodiments be configured to generate feedback signal(s) 52 indicative of the rotational speed of bladed rotor 12. In some embodiments, feedback system 36 may be referred to as an "Np/beta" feedback system where Np represents the rotational speed of bladed rotor 12 and beta represents the angular position of adjustable blades 32. In some embodiments, detection unit 42 may perform other tasks associated with functions such as synchronization and/or synchrophasing of propellers for example.

FIG. 3 is a respective schematic front view of an exemplary sensor 40 of feedback system 36. Sensor 40 may comprise a magnet 54. Magnet 54 may be a permanent magnet that is stationary relative to phonic wheel 38. Magnet 54 may generate a magnetic field that intersects teeth 44 as phonic wheel 38 is rotated. Sensor 40 may have one or more coils 56A, 56B (also referred generally hereinafter as "coils 56") to generate one or more sensor signals 50 (see FIG. 2) in response to variations in the magnetic field caused by the movement of teeth 44.

As depicted in FIG. 3, sensor 40 may include housing 58 and pole piece 60 configured to direct the magnetic field generated by magnet 54 toward phonic wheel 38 at a location expected to be occupied by teeth 44. Pole piece 60 may be coupled to one pole of magnet 54 and be configured to direct the magnetic field radially inwardly (or outwardly) generally along sensor axis SA and toward phonic wheel 38 so that the magnetic flux exiting the distal end of pole piece 60 may intersect teeth 44 as teeth 44 move past sensor 40. Pole piece 60 may be a structure comprising material of relatively high magnetic permeability that serves to direct the magnetic field generated by magnet 54 toward teeth 44. Pole piece 60 may be coupled to a pole of magnet 58 and in a sense extend the pole of magnet 54 toward phonic wheel 38. Pole piece 60 may be disposed between magnet 54 and phonic wheel 38.

In some embodiments, sensor 40 may have a single-channel configuration and accordingly may have a single coil configured to generate one or more sensor signals 50 in response to variations in the magnetic field caused by the movement of teeth 44. However, in some embodiments, sensor 40 may have a multi-channel configuration wherein sensor signals 50 are acquired in a redundant manner. FIG. 3 shows an exemplary configuration of coils 56A and 56B for a two-channel configuration of sensor 40 where coils 56A and 56B are electrically-isolated from each other and may provide redundant sensor signals 50 in response to variations in the magnetic field. For example, coil 56A may be configured to generate one or more first sensor signals 50 (e.g., voltages) on a first channel in response to the variations in the magnetic field, and coil 56B may be configured to generate one or more second sensor signals 50 (e.g., voltages) on a second channel in response to the variations in the magnetic field.

Other sensors used in a feedback system for determining a respective pitch position of pitch-adjustable blades of a bladed rotor are disclosed in U.S. Patent Publication No. 2018/0304991 A1 (title: FEEDBACK SYSTEM FOR PITCH-ADJUSTABLE BLADES OF AIRCRAFT BLADED ROTOR), which is incorporated herein by reference.

FIG. 4A is a schematic top view of sensor 40 in relation to teeth 44A, 44B and 44C (also referred generally hereinafter as "teeth 44") about to be detected by sensor 40 as phonic wheel 38 rotates. FIG. 4B is a schematic side view of sensor 40 in relation to teeth 44 about to be detected by sensor 40 as phonic 38 rotates about rotation axis R. FIGS. 4A and 4B each show a portion of annular body 46 that has been flattened for clarity of illustration. Teeth 44 may have the form of elongated teeth or walls that protrude radially outwardly from a radially outer surface of annular body 46.

Teeth 44 may comprise axial edges or terminations/faces 62A, 62B (also referred generally hereinafter as "axial edges 62") where elongated teeth 44 terminate in the axial direction relative to rotation axis R (see FIG. 2). In some situations, it may be desirable to permit sensor 40 to be positioned near edges 62 and still be able to accurately detect the passing of teeth 44 despite any edge-related effects that may influence the magnetic field around sensor 40. This may allow to more fully use the axial dimension of phonic wheel 38 and promote efficient packaging of phonic wheel 38 by not requiring extra axial length of phonic wheel 38 for the purpose of avoiding such edge-related effects. In some situations, the amount of axial travel of phonic wheel 38 may be dependent on the specific type of bladed rotor 12 and installation constraints.

In some embodiments, phonic wheel 38 may have one or more elongated teeth 44 that are substantially aligned with (i.e., parallel to) rotation axis R. In some embodiments, phonic wheel 38 may have one or more elongated teeth 44 that are oriented to be non-parallel (e.g., oblique) to rotation axis R. In some embodiments, elongated teeth 44 of phonic wheel 38 may all be substantially aligned with (i.e., parallel to) rotation axis R. In some embodiments, elongated teeth 44 of phonic wheel 38 may all be non-parallel to rotation axis R. In some embodiments, phonic wheel 38 may have one or more elongated teeth 44 that are non-parallel (e.g., oblique) to rotation axis R, and one or more elongated teeth 44 that are substantially aligned with (i.e., parallel to) rotation axis R. In some embodiments, it may be desirable to have at least one tooth 44 that is aligned with the rotation axis and an adjacent tooth 44 that is oblique to the rotation axis R. The different orientations of adjacent elongated teeth 44 may provide different detection timing between adjacent teeth 44 at different axial positions of phonic wheel 38 relative to sensor 40 and such different detection timing may be used to identify the axial position of phonic wheel 38 and correlate such axial position to the angular position of adjustable blades 32. Approaches for extracting meaningful information from the passing of teeth 44 are disclosed in U.S. Patent Publication No. 2015/0139798 A1.

As depicted in FIG. 4A, teeth 44A and 44B each have first axial end 63A relative to rotation axis R, second axial end 63B opposite first axial end 63A, and mid portion 64 extending between first axial end 63A and second axial end 63B. Tooth 44A may be substantially parallel to rotation axis R having first axial end 63A and second axial end 63B disposed at a same angular positions relative to rotation axis R. Tooth 44B may be oblique to rotation axis R having first axial end 63A and second axial end 63B of tooth 44B disposed at different angular positions relative to the rotation axis R. Axial ends 63A, 63B (also referred generally hereinafter as "axial ends 63") each may be proximal a respective axial edge 62 of a tooth 44.

Teeth 44, which are circumferentially distributed around phonic wheel 38, may be used in conjunction with a digital counting function of detection unit 42 for the purpose of determining the rotation speed of bladed rotor 12 and the pitch setting of blades 32. When sensor 40 is positioned near edge 62A, phonic wheel 38 having at least some of teeth 44 configured as tooth 44A, raised axial end(s) 63A or 63B may promote an accurate determination of a rotation speed of bladed rotor 12.

FIGS. 5A, 5B and 5C depict a perspective view, top view and front view, respectively of a portion of the tooth 44A of FIG. 4A proximal axial edge 62A of tooth 44A. FIG. 5C further illustrates sensor 40 disposed in relation to axial edge 62A of tooth 44A when tooth 44A is being detected by sensor 40 as phonic wheel 38 rotates about rotation axis R (shown in FIG. 2).

First axial end 63A may be raised and have a greater height 66 from the annular body 46 than a height 69 of mid portion 64 from the annular body 46. In some embodiments, mid portion 64 may have a substantially axially uniform height from the annular body 46. A progressive transition 72 may be defined between first axial end 63A and mid portion 64. In some embodiments, progressive transition 72 may be rounded. As depicted in FIG. 5C, transition 72 may be a fillet between mid portion 64 and first axial end 63A.

In some embodiments, first axial end 63A and second axial end 63B may both be raised and both have a height 66 from annular body 46 that is greater than height 69 of mid portion 64 from annular body 46. In some embodiments, height 66 may be about 1.1 time the height 69. In some embodiments, height 66 may be greater than 1.1 time the height 69. In some embodiments, height 66 may be between 1.1 and two times the height 69. In some embodiments, height 66 may be about two times the height 69. First axial end 63A and second axial end 63B may have substantially the same or different heights 66 from annular body 46. This tooth configuration may be desirable when additional flux guiding capacity (without excessive axial length) is desirable at both axial ends 63A, 63B of a same tooth 44. Alternatively, second axial end 63B may not be raised and may have a height 66 from the annular body 46 that is substantially the same as height 69 of mid portion 64 from annular body 46. This tooth configuration may be desirable when additional flux guiding capacity (without excessive axial length) is desirable only at one axial end 63A of tooth 44.

Sensor 40 is located at an axial distance 70 from first axial end 63A and at a height 68 from the annular body 46. In some situations, it may be desirable to have sensor 40 at a height 68 that is between height 69 of the mid portion 64 and height 66 of the first axial end 63A during use. In some situations, such positioning of sensor 40 may benefit from the additional flux guiding capacity provided by raised axial end 63A and promote an accurate detection of tooth 44A by sensor 40 as phonic wheel 38 is rotated. First axial end 63A may have an axially extending length 75.

FIG. 6A is a front elevation view of another exemplary tooth 144 having a chamfered transition 73 between raised end portions 163A, 163B and mid portion 164. It is understood that tooth 144 may have only one raised end portion 163A or 163B and accordingly only one transition 73.

FIG. 6B is a front elevation view of another exemplary tooth 244 having a step between raised end portions 263A, 263B and mid portion 264. It is understood that tooth 244 may have only one raised end portion 263A or 263B.

FIG. 7A is a cross-sectional view of sensor 40 proximal axial edge 62A of tooth 44C of FIG. 4A that generates a magnetic field that intersects tooth 44C. FIG. 7B is a cross-sectional view of sensor 40 proximal axial edge 62A of tooth 44A of FIG. 4A that generates a magnetic field that intersects tooth 44A.

In some situations, when sensor 40 is positioned away from edges 62 of a tooth 44 such that the magnetic field is not influenced by edge 62, a tooth such as the tooth 44C may be accurately detected by sensor 40. In this situation, the return path for the magnetic flux has a substantially symmetrical permeability across sensor axis SA provided by sufficient amounts of material (e.g., ferrous metal) from tooth 44C being located on each side of sensor 40.

However, when sensor 40 is positioned near one of the axial edges 62 as illustrated in tooth 44C of FIG. 7A, there may be an edge-related effect exhibited in the magnetic field. The edge-related effect may result in asymmetric permeability and skewing of the magnetic field. The non-uniformity of the magnetic field may be due to an uneven distribution of material (e.g., ferrous metal) on each side of sensor 40. The magnetic flux density on each side of sensor 40 may be different when sensor 40 is located proximal axial edge 62A of tooth 44C. The side most proximal to axial edge 62A may have a lower magnetic flux density due to an increased presence of air and a reduced presence of material in comparison to a mid portion 64 of tooth 44C for example. The skewing of the magnetic field exhibited with sensor 40 is schematically illustrated in FIG. 7A by line M being offset from sensor axis SA and by the asymmetry of magnetic flux 74 and 76.

Such edge-related effect exhibited in the magnetic field may cause some error with sensor signals 50 produced by coils 56A and 56B. In some embodiments, such errors can include some error(s) in the determined axial position of phonic wheel 38 and/or some discrepancies between supposedly redundant sensor signals 50 obtained from separate coils 56A and 56B of different channels. In some situations, additional length of teeth 44 may be required beyond each end of the axial travel of phonic wheel 38 relative to sensor 40 in order to avoid potential errors from such edge effects.

As depicted in FIG. 7B, sensor 40 is positioned near axial edge 62A of tooth 44A. Raised axial end 63A proximal axial edge 62A provides highly-permeable magnetic return path(s) that may promote symmetry across sensor axis SA. Axial end 63A may substantially eliminate edge-related effects otherwise exhibited in a magnetic field using a tooth without a raised axial end. Axial end 63A of tooth 44A may provide additional material near the axial edge 62A in comparison to tooth 44C that has a uniform height. Tooth 44A having axial end 63A may have a substantially equal distribution of material on each side of sensor 40 that is detectable by sensor 40.

FIG. 8 is a flowchart illustrating an exemplary method 78 for providing a feedback signal using a phonic wheel. Method 78 can be performed using the phonic wheel 38 described herein or other phonic wheels. It is understood that aspects of method 78 can be combined with aspects of other methods described herein. In various embodiments, method 78 includes:

directing a magnetic field from sensor 40 toward a location that tooth 44 of phonic wheel 38 is expected to occupy as tooth 44 rotates relative to sensor 40, the magnetic field including magnetic flux intersecting the location that the rotating tooth 40 is expected to occupy, tooth 44 having first axial end 63A relative to rotation axis R of tooth 44, second axial end 63B opposite first axial end 63A, and mid portion 64 extending between first and second axial ends 63A, 63B, mid portion 64 having a substantially axially uniform height 69, first axial end 63A having a greater height 66 than height 69 of mid portion 64 (see block 80); and using first axial end 63A of tooth 44 to guide some of the magnetic flux intersecting tooth 44 (see block 82);

detecting a variation in the magnetic field caused by movement of tooth 44 in the magnetic field (see block 84); and generating a feedback signal based on the detection of the variation in the magnetic field (see block 86).

In some embodiments, sensor 40 is positioned between height 69 of mid portion 64 of tooth 44 and height 66 of first axial end 63A of tooth 44 to promote an accurate detection of a variation in the magnetic field caused by movement of tooth 44.

In some embodiments, tooth 44 includes progressive transition 72 or 73 between mid portion 64 and first axial end 63A to guide some of the magnetic flux intersecting tooth 44 to promote an accurate detection of a variation in the magnetic field caused by movement of tooth 44.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A phonic wheel comprising:
   a body configured to rotate about a rotation axis; and
   a tooth attached to the body, the tooth having a first axial end relative to the rotation axis, a second axial end opposite the first axial end, and a mid portion extending between the first and second axial ends, the mid portion having an axially uniform height from the body, the first axial end having a greater height from the body than the height of the mid portion.

2. The phonic wheel as defined in claim 1, wherein the second axial end of the tooth has a greater height from the body than the height of the mid portion.

3. The phonic wheel as defined in claim 1, wherein the first and second axial ends of the tooth are disposed at different angular positions relative to the rotation axis.

4. The phonic wheel as defined in claim 3, wherein:
   the tooth is a first tooth;
   the phonic wheel includes a second tooth attached to the body;
   the second tooth is angularly spaced apart from the first tooth;
   the second tooth has a first axial end relative to the rotation axis and a second axial end opposite the first axial end of the second tooth; and
   the first and second axial ends of the second tooth are disposed at a same angular position relative to the rotation axis.

5. The phonic wheel as defined in claim 1, wherein the first and second axial ends of the tooth are disposed at a same angular position relative to the rotation axis.

6. The phonic wheel as defined in claim 1, wherein the tooth includes a progressive transition between the mid portion and the first axial end.

7. The phonic wheel as defined in claim 6, wherein the progressive transition is rounded.

8. A feedback system for pitch-adjustable blades of a bladed rotor coupled to an aircraft engine, the system comprising:
   a feedback rotor configured to rotate with the aircraft bladed rotor about a rotation axis, the feedback rotor being axially displaceable along the rotation axis to a plurality of axial positions, the axial position of the feedback rotor corresponding to a respective pitch position of the pitch-adjustable blades, the feedback rotor having:
      a body; and
      a tooth attached to the body, the tooth having a first axial end relative to the rotation axis, a second axial end opposite the first axial end, and a mid portion extending between the first and second axial ends, the mid portion having an axially uniform height from the body, the first axial end having a greater height from the body than the height of the mid portion; and
   a sensor mounted adjacent the feedback rotor and configured to generate a sensor signal indicative of a proximity of the tooth to the sensor as the feedback rotor rotates relative to the sensor; and
   a detector operatively connected to the sensor and configured to generate a feedback signal indicative of the respective pitch position of the pitch-adjustable blades in response to the sensor signal received from the sensor.

9. The system as defined in claim 8, wherein a height of the sensor from the body is between the height of the mid portion of the tooth and the height of the first axial end of the tooth.

10. The system as defined in claim 8, wherein the second axial end of the tooth has a greater height from the body than the height of the mid portion.

11. The system as defined in claim 8, wherein the first and second axial ends of the tooth are disposed at different angular positions relative to the rotation axis.

12. The system as defined in claim 8, wherein the first and second axial ends of the tooth are disposed at a same angular position relative to the rotation axis.

13. The system as defined in claim 8, wherein the tooth includes a fillet between the mid portion and the first axial end.

14. A method for providing a feedback signal using a phonic wheel, the method comprising:
   directing a magnetic field from a sensor toward a location that a tooth of the phonic wheel is expected to occupy as the tooth rotates relative to the sensor, the magnetic field including magnetic flux intersecting the location that the rotating tooth is expected to occupy, the tooth having a first axial end relative to a rotation axis of the tooth, a second axial end opposite the first axial end, and a mid portion extending between the first and second axial ends, the mid portion having an axially uniform height, the first axial end having a greater height than the height of the mid portion;
   using the first axial end of the tooth to guide some of the magnetic flux intersecting the tooth;
   detecting a variation in the magnetic field caused by movement of the tooth in the magnetic field; and
   generating a feedback signal based on the detection of the variation in the magnetic field.

15. The method as defined in claim 14, wherein the sensor is positioned between the height of the mid portion of the tooth and the height of the first axial end of the tooth.

16. The method as defined in claim 14, wherein the second axial end of the tooth has a greater height than the height of the mid portion, and the method includes using the second axial end of the tooth to guide some of the magnetic flux intersecting the tooth.

17. The method as defined in claim 14, wherein the first and second axial ends of the tooth are disposed at different angular positions relative to the rotation axis.

18. The method as defined in claim 14, wherein the first and second axial ends of the tooth are disposed at a same angular position relative to the rotation axis.

19. The method as defined in claim 14, wherein the tooth includes a progressive transition between the mid portion and the first axial end, and the method includes using the progressive transition to guide some of the magnetic flux intersecting the tooth.

\* \* \* \* \*